May 15, 1934.　　　H. A. JAHRAUS　　　1,958,756
SPEED CHANGER
Filed May 13, 1933　　　2 Sheets-Sheet 1
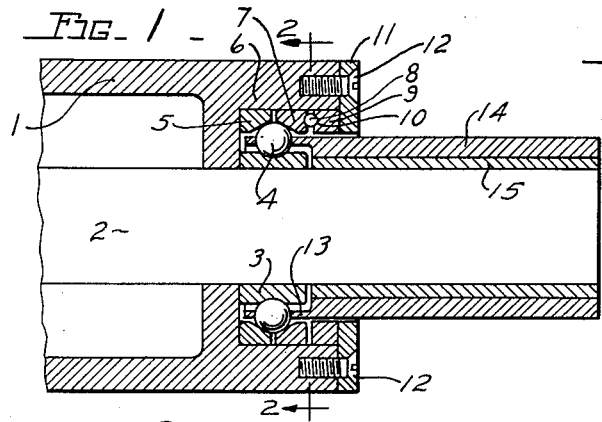
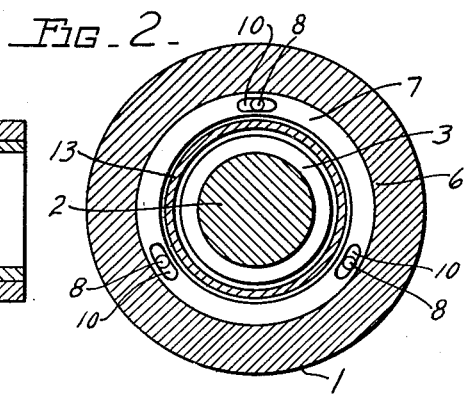
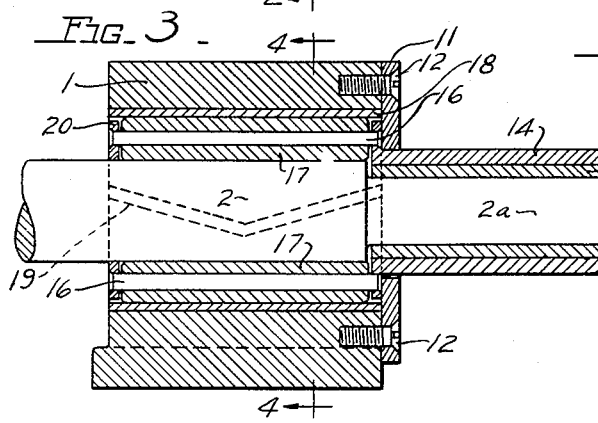
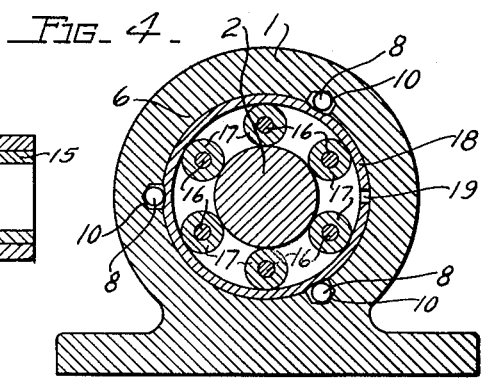
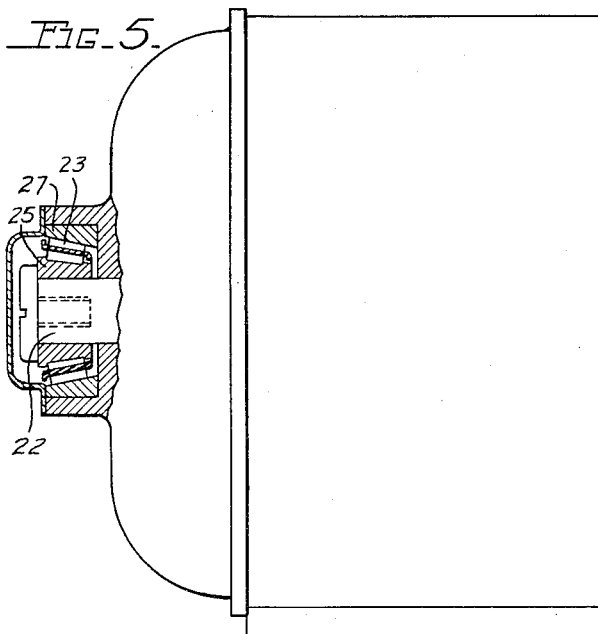
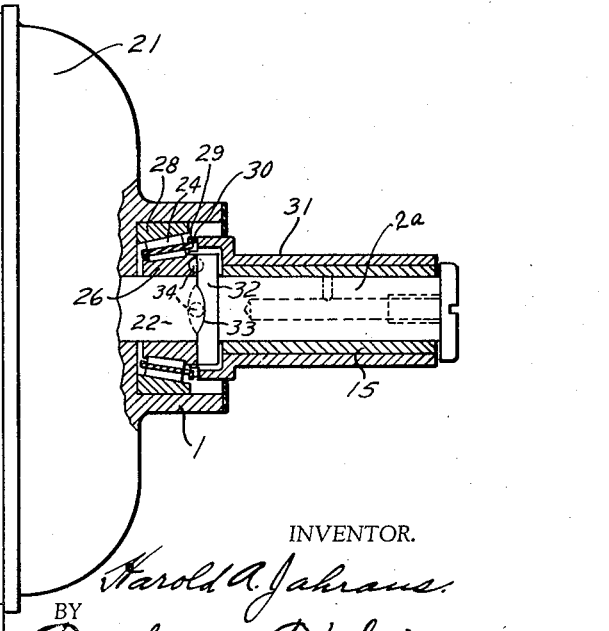
INVENTOR.
Harold A. Jahraus.
BY
Toulmin & Toulmin
ATTORNEYS.

May 15, 1934.  H. A. JAHRAUS  1,958,756
SPEED CHANGER
Filed May 13, 1933  2 Sheets-Sheet 2

Patented May 15, 1934

1,958,756

UNITED STATES PATENT OFFICE 1,958,756

SPEED CHANGER

Harold A. Jahraus, Richmond, Ind., assignor to Swayne, Robinson & Company, Richmond, Ind., a corporation of Indiana Application May 13, 1933, Serial No. 670,893

6 Claims. (Cl. 74—302)

My invention relates to speed changers.

It is my object to provide a mechanism which will simultaneously support a driving and driven shaft in its customary bearings at the same time changing the ratio between the driving and the driven member, either increasing or decreasing such ratio.

It is my object to provide a mechanism which takes advantage of roller or ball bearings in the nature of a planetary gear arrangement for making the ratio of speed without additional mechanism and thereby make it possible to provide a speed changer within a very small compass and obviate the present difficulty with large and cumbersome speed changers and those that consume large amounts of power.

It is my object to provide a speed changer of high efficiency whose ability to transmit power is automatically increased as the load to be transmitted is increased.

In particular, it is my object to provide such a speed changer which may be adapted to and become a part of mechanism, such as electric motors, without the necessity of having any cumbersome external mechanism for speed changing but which may be built into the power mechanism itself utilizing the roller or ball bearings of the mechanism for the speed changing.

It is my object in particular to provide a gearless speed changer of the planetary type, using friction rollers to transmit the power and change the speed thereof, the amount of compression placed on the friction rollers automatically increasing or decreasing in direct relation to the resistance against transmission which is offered the speed changer; hence, making a speed changer which is highly efficient under either light or heavy loads.

It is also my object to provide a gearless speed changer which will transmit and transform a rotary motion with a minimum of slippage, no matter how great the resistance offered, up to a point where the mechanism actually breaks.

It is also my object to provide a compact speed changer which may be adapted to and become a part of other mechanisms such as electric motors, utilizing the friction roller race of the speed changer to support parts of the other mechanism thus decreasing the cost of such an installation.

It is also my object to provide a speed changer in which the friction roller compression will be entirely relieved when the transmission load is taken off, thus taking no more power to drive under a free load condition than would be required to turn a shaft in a modern roller or ball bearing.

It is also my object to provide a speed changer in which the shock of sudden starting is absorbed by a gradual clutching action.

It is also my object to provide a speed changer which due to its form and compactness is especially adapted to be connected plurally in series thus making a transmission providing a plurality of speeds which may be taken off by a shift lever arrangement such as is used on automobile transmission.

Referring to the drawings:

Figure 1 is a section through one form of my speed changer employing a ball bearing;

Figure 2 is a section on the line 2—2 thereof;

Figure 3 is a view of similar mechanism employing a roller bearing;

Figure 4 is a section on the line 4—4 thereof;

Figure 5 is a side elevation of an electric motor partially in section showing the adaptation of my speed changer to an electric motor by which I am enabled to use the armature shaft bearings by suitable modifications to constitute my speed changer;

Figure 6:
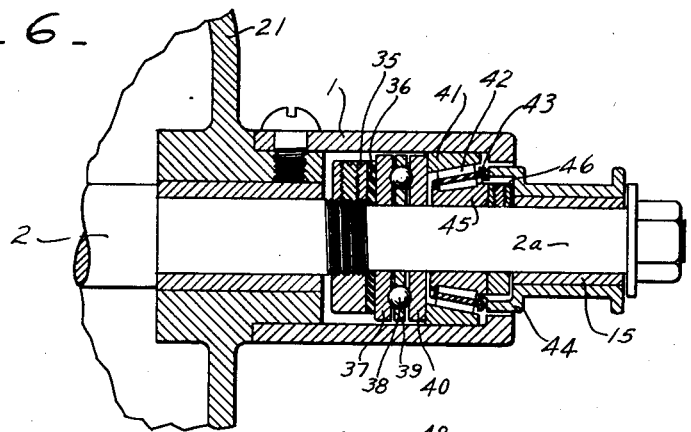
Figure 6 is a modified form of such a bearing and speed changer utilizing a rubber spring to put the rollers in compression, and intended to be used for light, constant loads.

In a taper roller bearing, comprising a stationary conical outer cup, conical rollers and a revolving conical inner surface, the rollers will rotate around the bearing with a true rolling motion and without angular slip, provided the apexes of all the conical parts coincide at a point on the axis of the bearing.

The angular velocity of the rollers or balls relative to the angular velocity of the inner cone varies as the ratio between the diameters of the inner cone and the outer conical cup, when these diameters are taken on their common conical base. This rule applies also to planetary gearing.

If the inner and outer cones are forced together against the rollers, the rollers will continue to rotate around the race against any resistance up to the amount of the product of the coefficient of friction of steel on steel times the pressure on the rollers normal to their surfaces.

In my invention, the rollers are wedged between the inner and outer cones by a slight movement of the inner cone along the axis of the bearing. This movement is actuated by a cam on the end of the cone, is automatic and varies with the resistance offered the driven member.

It will be further understood that the larger the internal diameter of the cone, the greater the reduction of speed.

Referring to Figure 1, 1 is a stationary support which supports the driving shaft 2. The driving shaft 2 has braced on it or fitted to it by a key the internal race 3 which carries the balls 4. The external race is provided in two parts—the left hand outer part 5 being a brace or key fitting on the interior of the collar end 6 of the stationary member 1, and the other part of the outer race at 7 is free to turn.

It is engaged by the balls 8 of the ball clutch wedge ring 9, the balls being mounted in tapered slots 10 so that, as the load is applied, there will be some accommodation to the variable load.

The clutch ring 9 is held in position by the plate 11 retained by the screws 12 on the end of the stationary member 1. By adjusting the angularity of the grooves 10 or the pressure upon the balls 8 a variation in the power may be obtained. The balls 4 are carried in a cage 13 which is formed as a part of the driven member or sleeve 14 which is mounted on a bearing sleeve 15 on the end of the driving shaft 2. Upon applying pressure on the balls 8 and, therefore, upon the right hand outer race ring part 7, the driving shaft 2 will drive the driven member 14 in proportion to the design of the apparatus and the amount of resistance to rotary movement of the balls 4.

Referring to Figure 3 where I have employed roller bearings instead of ball bearings, it will be noted that the driving shaft 2 has a reduced end 2a on which is mounted the bearing sleeve 15 supporting the driven sleeve 14. The driven sleeve in this connection is connected to a plurality of axles 16 constituting the supports for the rollers 17.

These rollers ride upon the external surface of the driving shaft 2 and on the internal surface of the clutch ring 18 which is split at 19. This clutch ring has a tendency to rotate which is resisted by the balls 8 operating against the faces 10 in the external ring 1. This, therefore, takes up the shock of starting and gradually applies the restricted force to the ring 18 which in turn resists the rotation of the rollers 17 on their axles 16. By adjusting the angularity of the faces 10 the power of the driving and driven members one to the other can be adjusted.

The sleeve 14 is retained in position by the plate 11. The inner ends of the axle 16 are connected to a ring 20.

Turning to Figure 5 it will be seen that these principles are applied to an electric motor 21 which has an armature shaft 22 which corresponds to the driving member 2 in the preceding drawings. The usual tapered roller bearings 23 and 24 support the armature shaft. The inner race 25 or 26 is mounted upon the armature shaft. This race or cone has a slip fit on the armature shaft and turns with the shaft. The rollers 23 and 24 turn within the respective cups 27 and 28. The rollers 24 have a cage 29 which has its outer end mounted in slots 30 in the end of the driven sleeve 31 so that the cage, the driven sleeve and the rollers rotate bodily together. Mounted on the armature shaft 22 is a fixed collar 32 having cam faces 33 receiving the balls 34 between the collar 32 and the cone 26 for the purposes heretofore described.

Thus, the armature shaft as it turns will carry the cone 26 with it. The collar 32 and the shaft 22 are held against right hand movement by the member at the left end of the shaft. The ball clutch through the balls 34 and surfaces 33 engages with the collar.

Referring to Figure 6 it will be noted that the driving shaft 2 has mounted on it an adjustably threaded collar 35 engaging a rubber spring disk 36 which in turn engages the race 37 carrying the balls 38 in a cage 39, the other half of the race being designated 40, the outside cup 41 and the tapered roller bearings 42.

These bearings are carried in the usual cage 43 which turns with the driven sleeve 44. The inner cone 45 is mounted on the shaft 2.

The inner cone 45 is abutted against the collar 46 which turns with the shaft 2. Thus, the amount of power the bearing can transmit is determined by the rubber spring disk 36 and its setting.

Figure 7:
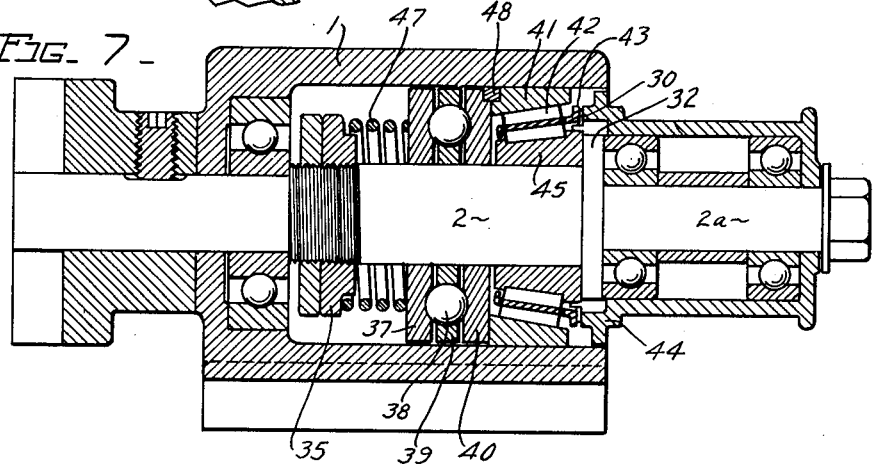
Figure 7 is a similar view in which I utilize a spring.
Figure 8:
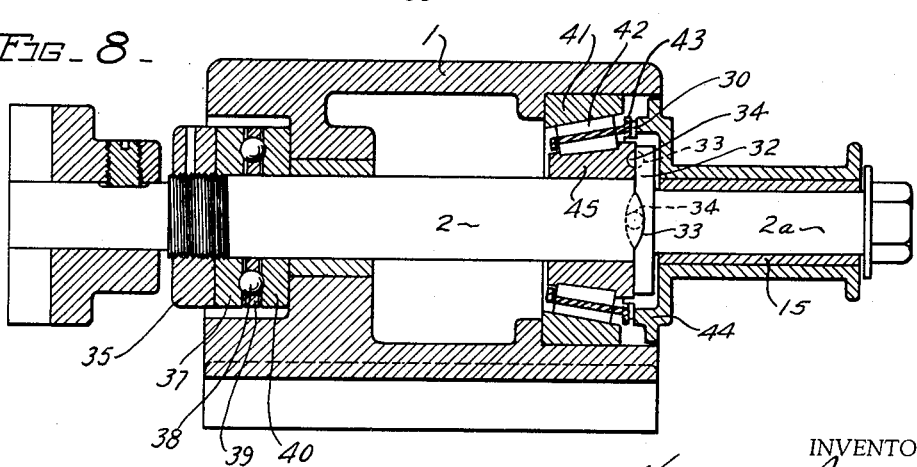
Figure 8 is a modified form.

In Figure 7 in place of the disk 36 a spring 47 may be employed. It is noted in this instance that the key 48 ties the race 40 and the cup 41 together.

In operation a rotating motion is applied to the driving shaft 2 in support 1. This motion is transmitted to the inner cone 3 through the cam surfaces and balls 8 and 10, causing the rollers or balls 4 to rotate about the inner cone carrying with them the cage 13. The outer part 5 of the external race is held stationary in the housing. The cage 13 is fastened to the driven member 14. When resistance is applied to the driven member it is carried through the cage 13 and balls 4 to the inner race 3, causing a slight differential of its motion relative to the driving shaft. This causes the balls to ride up on the cam surfaces 10, pushing the part 7 of the external race toward the part 5. It will be seen that the more resistance that is offered, the tighter the rollers will be wedged between the inner and outer cones. The angle of the cam surfaces to be made such that the friction caused by the wedging action will always be greater than the tendency of the rollers to slip against the resistance.

Although a standard taper bearing has been shown as the planetary system, it is understood that specially designed parts embodying the described action may be employed in practice. In the foregoing description the word rollers is intended to mean straight or tapered rollers, or balls.

It is understood that a suitable spring may be used to wedge the rollers in the race instead of a cam.

In the case of straight roller bearings, the action is the same, except that the cams act radially instead of parallel with the axis of the bearing.

The action of ball bearings is practically the same as taper roller bearings.

It will be understood that I desire to comprehend within my invention such modifications as may be necessary to adapt it to varying conditions and uses.

It will be understood that the amount of resistance applied to the exterior portion of the bearing on the outside of the rollers or balls is to be gradually greater than the load carried by the driven member in order to get the planetary effect and the difference in power between the driving and driven member.

Having thus fully described my invention, what

I claim as new and desire to secure by Letters Patent is:

1. In a speed changer, a driving means, a driven means, bearing means, a part of which is connected by friction engagement to the driving means and a part of which is connected to the driven means, and a pair of relatively movable ring members engaging one part to cause an engagement between said parts so that a movement of that part of the bearing means connected to the driving means will cause a movement of the driven means.

2. In combination, a driving shaft, a driven means freely mounted thereon, roller bearings mounted on said driving shaft, a cage aligning and supporting said bearings and turning therewith connected to said driven means, a clutch sleeve encircling and supporting the exterior of said roller bearings, a stationary support and clutch means interposed between said sleeve and said support for gradually increasing the clutch effect between said sleeve and said bearings whereby the driven means is caused to travel at a predetermined ratio with respect to the driving means gradually according to the clutch in a predetermined ratio depending upon the amount of such clutch effect.

3. In combination, a stationary support comprising a ring having cam surfaces therein, balls on said ring engaging said cam surfaces, a split ring inside of the first mentioned ring engaging said balls, rollers mounted within said second ring, a cage for said rollers, a driven means connected to said cage, and a driving shaft engaging the interior of said rollers whereby the adjustment of the balls will determine the ratio between the driving and the driven means.

4. The combination, in a speed changer, a driving shaft, a driven shaft, a power transmitting assembly comprising an inner cone, bearing members, a cage and a cup, said inner cone having a rotatable and sliding mounting on said driving shaft, a stationary means for supporting said cup, means on the driven shaft for engaging said cage, and a clutch between said inner cone and said driving shaft comprising cam surfaces on said cone and said driving shaft, and rolling members therebetween, said driven shaft having its support on said driving shaft and said cage engaging means extending over said clutch.

5. The combination, in a speed changer, a driving shaft, said driving shaft having a collar, a driven shaft, a power transmitting assembly comprising an inner cone, bearing members, a cage and a cup, said inner cone having a rotatable and sliding mounting on said driving shaft, stationary means for supporting said cup, means on the driven shaft for engaging said cage, and a clutch between said inner cone and said driving shaft comprising a cam surface located on one side of said inner cone, and a cam surface on said collar, and rolling members thereon, said driven shaft having its support on that side of the cone on which the cam surfaces are located.

6. In combination, in a speed changer, a driven shaft, a driving shaft, a collar on said driving shaft, said driving shaft having an extension, said extension forming a support for said driven shaft, and said driven shaft being sleeved thereon, a power transmitting assembly, comprising an inner cone, rolling bearing members, a cage and a cup, a stationary means for supporting said cup, said inner cone being rotatable and slidable on said driving shaft and having cam surfaces in one of its side faces, cam surfaces on said collar, rolling members interposed between said cam surfaces, and an offset portion on said driven shaft for engaging said cage.

HAROLD A. JAHRAUS.